UNITED STATES PATENT OFFICE 2,238,428

METHOD OF MAKING BASIC REFRACTORIES

Max Y. Seaton, Greenwich, Conn., and Hugh H. Hartzell, San Leandro, Calif., assignors, by mesne assignments, to Basic Dolomite, Incorporated, Cleveland, Ohio, a corporation of Ohio No Drawing. Original application May 23, 1935, Serial No. 23,128. Divided and this application May 20, 1938, Serial No. 209,140

4 Claims. (Cl. 106—9)

This invention relates to method of making basic refractories; and it comprises a method of producing heat-hardening and hardened basic refractories wherein materials containing large proportions of magnesia and small controlled proportions of silica and of lime are heated to a high temperature for a sufficient time to produce a crystallization of substantially pure, granular magnesia in periclase form in a matrix of highly refractory silicate, the operation being advantageously in two stages with an initial conversion of the greater part of the magnesia into periclase enclosed in a matrix of monticellite, the fired material being then comminuted, mixed with the proper proportion of lime to convert the monticellite into dicalcium silicate, and the mixture re-fired to produce a refractory consisting of periclase in a matrix of dicalcium silicate; all as more fully hereinafter set forth and as claimed.

Most of the magnesia refractories used in melallurgical furnaces are structurally weak; bricks, linings, etc., do not well withstand loads at high temperatures and are disintegrated by alternate heating and cooling. To a certain extent, high refractory properties as regards temperature are not consistent with good structural strength. Magnesia in a pure state is a weak material. It can be sintered and hardened by heat, the final result being crystallized or periclase magnesia, a substance of considerable hardness and rigidity. But periclase in mass is not a strong material.

We have found that dense, hard, refractory articles of good mechanical strength at high temperatures, can be made consisting of substantially pure, granular magnesia in periclase form held in a matrix or binder of lime and silica combined as calcium orthosilicate (dicalcium silicate); the silica-lime compound which has the highest fusing point of any of the calcium silicates.

The best combination of refractoriness and strength at high temperatures appears to be afforded by a material containing about 80–85 per cent of substantially pure, granular magnesia with a bonding material consisting of substantially pure, dicalcium silicate. To a certain extent, the relative proportions of matrix and periclase used in practice depend on the composition and purity of the particular materials available and on the details of firing. The proportion of matrix desirable varies somewhat with the particle size of the periclase. Sufficient refractoriness and mechanical strength can be obtained over a comparatively wide range of weight ratios between the magnesia and the matrix. We have made good refractories in which the matrix was as little as 5 per cent of the total while good refractories have also been produced in which the matrix constituted more than 20 per cent of the total. Sufficient refractoriness and good mechanical strength are obtained at either end of the range but we desire, ordinarily, compositions containing at least 80 to 85 per cent of included magnesia as periclase.

In heating a system composed of magnesia in major amount and a smaller amount of silica and lime, in equimolecular proportions, it is found that magnesia, lime and silica unite to form a molten magma of monticellite

$$(CaO.MgO.SiO_2)$$

as a liquid phase or eutectic including grains or crystals of magnesia of the nature of periclase. The size of the grain depends somewhat on the original particle size of the magnesia but with prolonged heating, the grains grow somewhat in size. All the magnesia in the system above that required to form monticellite (with a little MgO in solution) occurs as a disperse phase, as periclase. By doubling the proportion of lime, or by adding more lime to a monticellite magma, the result is different. The matrix now becomes a much higher melting body of dicalcium silicate. Monticellite is decomposed by lime added in the proper proportion, its MgO being displaced by a second CaO molecule and the displaced MgO crystallizing out as periclase; the new periclase joining that already present.

In the present invention these principles are utilized. Pure monticellite with a little excess magnesia melts at 2768° F., and does not soften much below this point. If there be a little alumina present, as is often the case, the fusing point may drop to 2640° F. and the softening point to around 2400° F. The presence of small amounts of iron has little effect on the fusing point or the softening point. A magma of monticellite with periclase becomes a plastic mass at the stated temperatures. Dicalcium silicate or calcium orthosilicate ($2CaO.SiO_2$) with the amount of magnesia it will hold in solution has a melting point of 3416° F., being a considerably more refractory substance. Again, the presence of impurities may lower the melting point somewhat, but with reasonably pure materials, the melting point is not below about 3200° F. A magma of calcium orthosilicate and periclase becomes plastic at the stated temperatures, but at all lower temperatures it is rigid and strong. In all cases, the purer the matrix, the higher is the temperature of fusion and of plasticity, respectively. The less the plasticity, the better is the mechanical strength at high temperatures. We ordinarily endeavor to secure raw materials as pure as possible, the ideal being pure periclase in a matrix of pure orthosilicate, the orthosilicate used being at first monticellite and later converted into dicalcium silicate. The purer the materials, the higher is the softening temperature. In this connection, however, we may note that a little iron and alumina are permissible. A little iron for example, occurring as ferric oxid or as ferrous oxid, goes into the dispersed phase; the former as dispersed crystallized magnesium ferrite and the latter in solid solution in the dispersed magnesia. In neither case is the refractoriness of the composition materially affected, since in neither case is the iron in the matrix. With greater amounts of iron, the refractory qualities are lessened. Alumina present in more than small amounts is undesirable, as it lowers the refractoriness. If any alumina be present, there should be provided enough excess lime to form tricalcium aluminate with all the alumina, over and above the lime required for the desired eutectic.

Dicalcium silicate or calcium orthosilicate, $2CaO.SiO_2$, exists in several physical forms. The terminology used as regards these is somewhat confused, but for the present purposes, the material produced and existing at a range of temperatures from about 2500° F. up may be called the alpha form. The pure hot material in alpha form, goes over without change of volume, as the temperature lowers, into a beta form, stable at an intermediate range of temperatures (down to approximately 1215° F.). The third modification, the gamma form, is stable at low temperatures; temperatures up to 1215° F. The beta form, however, in a pure state, undergoes a sudden rearrangement to the gamma form on cooling to about 1215° F. This is accompanied by an increase in volume which may be as high as 10 per cent and generally results in shattering. It has been found, however, that the desirable forms of dicalcium silicate can be stabilized against passage into the undersirable gamma form by the presence of extremely small amounts of other bodies. Alumina is a stabilizer, but it is undesirable in the composition in any substantial amount and a much better stabilizer is $P_2O_5$ in mere traces; amounts which are of the order of those often found in ordinary limestone. As little as one-half per cent of $P_2O_5$ calculated on the CaO is sufficient. $P_2O_5$ appears to stabilize the dicalcium silicate in the alpha or beta form; the material thus stabilized does not change with temperature changes; and there is no tendency to shatter with temperature changes.

While the direct production of periclase refractories with a eutectic or matrix of dicalcium silicate in a single operation is possible, as disclosed in our application Serial No. 23,128, of which this application is a division, we have found that, as a matter of practice, it is better to use a two-stage operation in which a matrix of monticellite with included periclase is first produced, and then the matrix is changed to dicalcium silicate. This requires two firings, but in the first firing the temperature required is lower and sufficient opportunity is given for nearly all the magnesia in the mixture to crystallize as periclase. There is but little of the total magnesia left in the matrix. By firing a suitable mixture until the described monticellite matrix is produced, cooling and grinding to suitable size, it is easy and quick to convert the matrix of monticellite into one of dicalcium silicate by admixture of a little lime with the comminuted material and refiring. The comminuted material resulting from the first firing, in admixture with lime, may be shaped into the form desired, bricks or granules, as the case may be, prior to the second firing. The second firing may be accomplished by the heat of the furnace in which the refractory is used. Granules, such as those used in lining basic open hearths, may be made of any size desired.

This embodiment we regard as the most desirable form of our invention since it enables the production of a heat-hardening basic refractory; a mixture which can be shaped or placed, as the case may be, and which under the influence of heat will first soften, become plastic and then become a unitary mass of higher melting point. A mixture of periclase bonded by monticellite, with a little lime, has these properties. For lining basic open hearths, granular material containing monticellite may be admixed with lime in the right proportion and put in place. Or, lime may be mixed with fine ground monticellite-bonded periclase and the mixture then granulated. In either event the granules become plastic, softening under the heat of the open hearth. Reaction takes place, with the formation of a unitary dense mass wholly refractory at its temperatures. Similarly, such a material may be tamped into place in a furnace wall, etc.

Basic open hearths are customarily provided with an acid roof; a roof containing silica as a predominating constituent. Roof and hearth are separated by an intermediate course of neutral brick; often chromite. This practice is for the reason that no basic refractory has been known heretofore which was sufficiently strong to warrant its use as a roof. Bricks made under the present invention with a matrix of dicalcium silicate are amply strong for this purpose. They are not only strong enough at the temperatures encountered, but they are basic and inert. No intermediate course of neutral bricks between roof and hearth is necessary.

All natural magnesites contain more or less silica and lime, but with a good grade the amount of either may be small enough to require correction by addition of further lime or further silica, either or both. In going through the routine of first making a monticellite matrix and then converting this into a dicalcium silicate matrix, the amount of lime used in the first mix should be proportioned accordingly, and in making the second mix there is added a quantity of lime equal to or a little more than that of the first mix. Magnesia precipitated in chemical processes, as in treating bitterns and brines with lime, usually contains a little lime but requires the addition of more. Silica must be added. In adding lime, it is best to do it as milk of lime to secure intimate admixture of the very small amount of lime.

Considerable difficulty is encountered if it is attempted to convert the magnesia, lime and silica to periclase bonded by calcium orthosilicate in a direct or one-stage process, because the refractory mass produced by direct burning of the completely corrected raw material is so highly refractory that the particles do not sinter easily. The temperatures required are too high for fuel-fired furnaces; and moreover the sintered mass is apt to be more or less porous. The higher the purity of the materials, the more difficult it is to obtain satisfactory results, and the difficulties are great with the high purity materials we wish to employ. But our two-stage procedure allows a satisfactory solid article to be produced, even with raw materials of highest purity.

When bricks are to be made up, it is convenient, in correcting the mix containing the monticellite, to add some or all the CaO in the form of hydrated lime. Hydrated lime serves as a lubricant in brick-making and is otherwise desirable.

Raw materials of high purity are commercially available for the present purposes; but iron in small amounts is, as previously stated, neither especially desirable nor detrimental in the present process. In the finished article, it occurs as stated: ferric oxid goes into the disperse phase as crystallized magnesium ferrite; ferrous oxid occurs in solid solution in the periclase. Usually, amounts of iron oxids below about one to three per cent have no appreciable effect either way as regards refractoriness in the present invention. Alumina should be absent; but if present should not exceed amounts of the order of 0.5 per cent, with total fluxing oxides less than 1 per cent.

Stabilized dicalcium silicate is in itself an excellent refractory material, more basic than acid. But it is better from all points of view, used as a matrix for granular material of higher melting points, such as crystallized periclase.

In an example of a specific embodiment of the invention, employing the two step treatment and producing a heat hardening material, the raw material was a crude hydrated magnesia (magnesium hydroxid) having the following analysis (on a dry basis):

| | Parts by weight |
|---|---|
| $SiO_2$ | .75 |
| $Al_2O_3$ | .30 |
| $Fe_2O_3$ | .20 |
| CaO | .50 |
| MgO | 98.25 |

To 100 parts of this raw material were added 2.5 parts silica and 3.5 parts lime (CaO), both in the form of fine powders, and the ingredients were thoroughly mixed. The mix was fed to a rotary kiln and burned at a high temperature; around 3000° F. The resulting product had the following analysis:

| | Parts by weight |
|---|---|
| $SiO_2$ | 4.30 |
| $Al_2O_3$ | .40 |
| $Fe_2O_3$ | .30 |
| CaO | 5.30 |
| MgO | 89.70 |

Upon examination, the product was seen to have a matrix largely composed of monticellite, with periclase (in amount about 86.6 per cent by weight) as disperse phase. The product had a softening temperature of around 2800° F. and could readily be sintered into hard nodules. Conditions in the kiln were adjusted, however, to prevent any substantial fusion; the product was granular. The granule composition was then corrected by the addition of 3.35 parts lime as CaO per 100 parts product. The mix was ground to a suitable grain size and the pulverized material was mixed with a temporary binder, dextrine in this case, to form unburned bricks. These, upon subjection to strong heating, sintered and partially fused with the development of the desired structure; periclase in a matrix largely composed of calcium orthosilicate. In addition to making into bricks, the granular material was adapted for use without pressing, as a furnace bottom material, to form a unitary lining.

In working with pure magnesias and magnesites, it is convenient to use a natural magnesium silicate of the talc and soapstone type, as a source of silica. Equilibrium is more quickly and readily reached than in using silica itself in the quartzose form of ordinary sand. Olivine is sometimes useful.

Dolomitic lime used in the present invention adds both CaO and MgO to the mix and can be used in introducing the calculated amount of CaO.

In the embodiment given, the materials used chanced to contain $P_2O_5$ in very small amount but sufficient to stabilize the dicalcium silicate. In other cases using materials free of $P_2O_5$ in detectable traces, any suitable phosphate, such as rock phosphate can be added; the amounts usually ranging between one and ten per cent $P_2O_5$ on the total lime. Also, various other compositions containing a total less than one per cent of iron oxides and alumina and containing 80 to 95 per cent MgO in periclase form, with the balance substantially all dicalcium silicate, have been produced in accordance with our invention. In some instances the monticellite-periclase-lime composition was hardened by heating in place; and in some instances bricks of this composition were fired before use to convert the monticellite and lime to calcium orthosilicate. In all cases, the final product had great strength and refractoriness.

What we claim is:

1. The process of making magnesia refractories of high structural strength and great refractoriness which comprises heating magnesia with silica and lime in sufficient proportion to form a eutectic of monticellite with crystallization of the magnesia as periclase, cooling, comminuting, mixing with enough fine material containing CaO to convert the monticellite into calcium silicate and reheating to effect this change and produce a hard solid matrix of dicalcium silicate enclosing and bonding the crystallized periclase.

2. The process of claim 1 wherein the material containing CaO is caustic lime.

3. The matter of claim 1 wherein the admixed material containing lime is dolomitic lime.

4. Method of making a refractory composition comprising firing a mixture containing magnesia, lime and silica to produce a refractory material containing principally periclase and relatively low-melting calcium magnesium silicates, mixing the fired material with lime, and firing the mixture to produce a refractory material containing principally periclase and dicalcium silicate.

MAX Y. SEATON.
HUGH H. HARTZELL.

CERTIFICATE OF CORRECTION.

Patent No. 2,238,428. April 15, 1941.

MAX Y. SEATON, ET AL.

It is hereby certified that error appears in the printed specification of the above numbered patent requiring correction as follows: Page 3, second column, line 51, claim 1, for "calcium" read --dicalcium--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.